United States Patent [19]
Besson et al.

[11] 3,936,767
[45] Feb. 3, 1976

[54] COLD CATHODE GAS LASERS
[75] Inventors: André Besson; Jacques Bécrelle, both of Paris, France
[73] Assignee: Thomson-CSF, Paris, France
[22] Filed: May 18, 1973
[21] Appl. No.: 361,605

[30] Foreign Application Priority Data
May 24, 1972 France .............................. 72.18488

[52] U.S. Cl. ...... 331/94.5 D; 331/94.5 PE; 313/217; 313/218; 313/220; 330/4.3; 331/94.5 G
[51] Int. Cl.² ...................... H01S 3/22; H01S 3/03
[58] Field of Search .................... 331/94.5; 330/4.3; 313/217, 218, 220

[56] References Cited
UNITED STATES PATENTS 3,614,642 10/1971 Hochuli et al. ................ 331/94.5 X
3,713,043 1/1973 Avivi et al. ......................... 331/94.5
3,851,272 11/1974 Shull et al. .......................... 331/94.5
R27,282 2/1972 Kolb, Jr. ............................ 331/94.5

Primary Examiner—Robert J. Webster
Attorney, Agent, or Firm—Roland Plottel

[57] ABSTRACT

Cold cathode gas lasers where the cathode of the circuit exciting the discharge, is an aluminium tube which forms an integral part of the sealed envelope of the laser.

Such a structure can be used in lasers whether coaxial or otherwise. It makes it possible to improve their performance characteristics and to reduce their cost.

4 Claims, 4 Drawing Figures

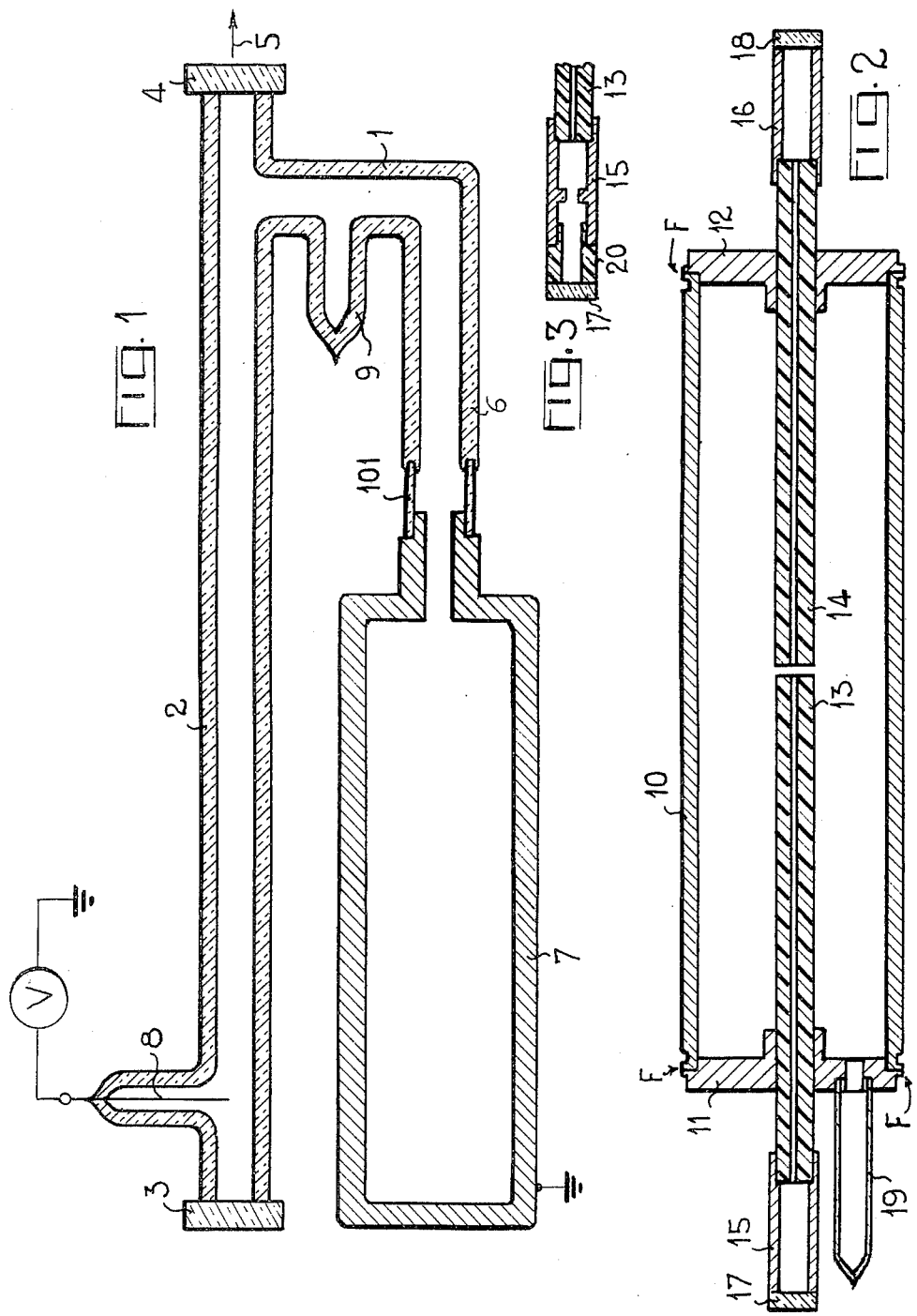

COLD CATHODE GAS LASERS

The present invention relates to improvements in gas lasers. It relates more particularly to a novel method of designing the cathode of the excitation circuit which produces the discharge through the gas mixture in such lasers, such circuits being constituted in a manner known per se by two electrodes, a cathode and an anode.

Generally speaking, a gas laser comprises, within a sealed glass envelope filled with a gas mixture (helium and neon for example), on the one hand a mirrored resonant cavity which maintains and produces the electromagnetic microwave or lightwave or again "laser" wave, and on the other hand an excitation circuit constituted by an anode and a cathode. The application of a suitable voltage between the cathode and the anode gives rise to a discharge through the mixture and the laser lightwave is maintained and amplified in the cavity in a conventional manner. The cathode may be a cold cathode or a hot cathode. The invention applies solely to cold cathode lasers.

Depending upon the structure of the laser in question, the cathode may be located either outside the resonant cavity the glass envelope then taking the form of a U one of whose legs constitutes the cavity whilst the other contains the cathode, or around the resonant cavity itself the laser then having a structure sometimes referred to as "coaxial". Some embodiments of coaxial lasers are for example described in the U.S. Pat. No. 3,495,119. The invention applies equally to both these types of lasers.

In either case of the prior art, the cathode is an electrode of cylindrical tubular form and is enclosed in the glass envelope. This structure has several drawbacks. The area of the cathode is necessarily limited and this increases the degree to which it is heated; moreover heat dissipation is extremely difficult since it is realised through the glass envelope which constitutes a heat barrier. The power which can be delivered by such lasers is consequently limited.

The object of the present invention is to improve the structure of cold-cathode gas lasers and make it possible, for the same overall size of the laser tube, to employ cathodes of larger surface area which do not therefore tend to heat up so much during operation and are moreover very easy to cool.

Moreover, the improved lasers in accordance with the invention are less fragile and simpler to manufacture than the prior art ones, especially in the coaxial form.

As a matter of fact, the classical lasers and even the coaxial lasers of the prior art have a structure somewhat complicated with regard to the setting up of the two mirrors onto the resonant cavity. These mirrors generally are not set directly on the glass envelope but on a rigid frame looking like a girder which also supports the laser itself. The reason for that is that the orientation of the mirrors must be very precise in relation to the cavity axis and must remain precise all along the operating of the laser. If the mirrors were directly fixed on the glass envelope, the heating of said envelope due to the discharge in the cavity, would produce mechanical distortions affecting the precision of the mirrors position. Of course using such a frame is an important drawback with regard to the setting of the lasers as well as with regard to their cumbersomeness and their solidity.

The coaxial lasers of the invention do not need such an auxiliary frame while being as precise as those having such a frame.

According to the invention, there is provided a cold cathode gas laser comprising, within a sealed envelope containing a gas mixture, a resonant cavity with two semi-reflective mirrors, and a circuit for exciting a discharge in the gas mixture, said circuit comprising a cold cathode and an anode between which an excitation voltage is applied, said cathode being constituted by an aluminium tube forming an integral part of said sealed envelope.

The invention will be beter understood from a consideration of the ensuing description, and the accompanying drawings in which:

FIG. 1 is a schematic sectional view of a gas laser not having a coaxial structure;

FIG. 2 is a schematic sectional view of a possible embodiment of a coaxial gas laser having two anodes;

FIG. 3 is a sectional view of a variant embodiment of part of the laser shown in FIG. 2.

FIG. 1 illustrates in a schematic sectional view, the essential elements of one embodiment of a cold-cathode gas laser incorporating the improvement of the present invention, the system being a non-coaxial one.

Figure 4:
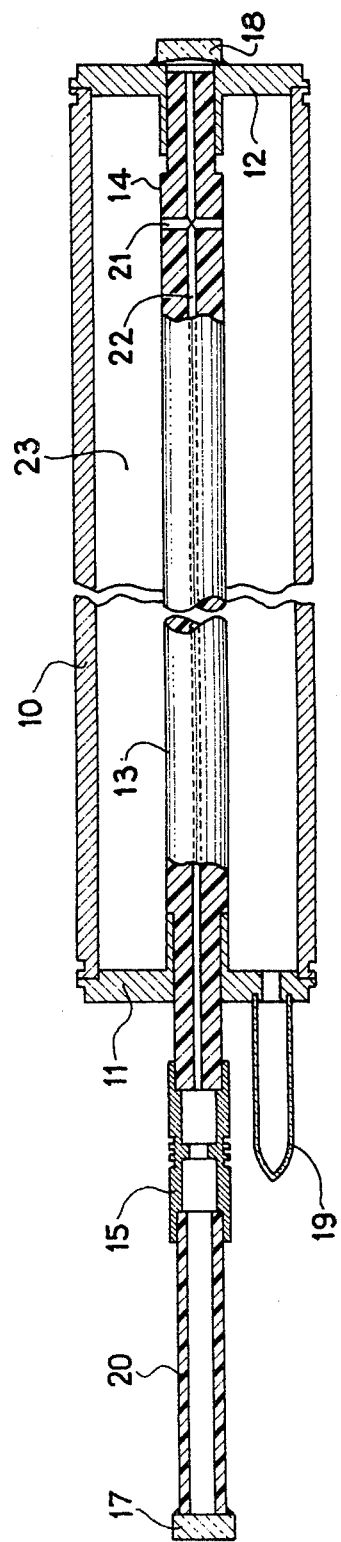
FIG. 4 is a schematic sectional view of a coaxial laser having a single anode.

The glass sealed envelope 1 comprises a first branch 2 which constitutes the resonant cavity and is closed off at its two ends by two semi-reflective mirrors 3 and 4. The mirror 4 is for example the one which passes the output lightwave from the cavity (arrow 5). The second branch 6 of the envelope is terminated in accordance with the invention by a cylindrical tube 7 of aluminium constituting the cathode of the excitation circuit whose anode is for example located at 8.

This tube 7 is of course closed at one of its ends whilst at the other it is soldered to the branch 6 of the envelope. The cathode 7 is connected to the glass envelope 6 for example by means of a tubular component 101 made of an alloy weldable to the glass of the envelope, for example Covar.

The cathode 7 is placed at a reference potential such as earth potential, whilst the anode 8 is placed at a potential V capable of triggering the discharge through the gas mixture filling the sealed envelope thus constituted.

This gas mixture is, for example, a conventional helium-neon mixture introduced into the envelope through a pumping pip 9 following prior evacuation of the envelope through said pip.

The advantages, already described, for the improved lasers in accordance with the invention are clear. On the one hand, the dimensions of the cathode are not limited by those of the glass envelope; on the other, the cathode is in direct contact with the extermal atmosphere and is therefore very easy to cool.

FIG. 2 schematically illustrates an improved laser in accordance with the invention, of coaxial design. Here, again, we are dealing with a gas laser (helium-neon mixture for example) of cold cathode type.

The cathode 10 is constituted by a cylindrical aluminium tube to the ends of which there are soldered two end plates 11 and 12 likewise of aluminium. Each of these end plates is centrally traversed by a capillary tube 13, 14 of a rigid insulating material, for example ceramic. These two capillaries are located in extension of one another and are spaced slightly apart; the space between them gives passage to the discharge as explained hereinafter.

At the outside end of each capillary 13, 14, a cylindrical anode 15, 16, made for example of Covar, is attached. Finally, on these two anodes the two semi-reflective mirrors 17 and 18 closing off the envelope and constituting, with the internal part of the capillaries 13, and 14, the resonant cavity amplifying the laser wave resulting from the discharge described hereinafter, are assembled.

When all these elements have been assembled together, it is possible by means of a pip 19 to evacuate the sealed envelope thus constituted, and then to fill it with a suitable gas mixture. It is then sealed using conventional methods.

This embodiment is particularly simple to put into effect; it makes it possible to obtain, at relatively low cost, a laser possessing good performance characteristics and an interesting structure.

As explained hereinabove, this structure makes it possible to omit the frame generally supporting on the one hand the laser itself and on the other hand the cavity mirrors; said frame is replaced in the lasers of the invention by the aluminium tube cathode itself.

The thus realised lasers have a compact structure because the mirrors are directly fixed on the resonant cavity while said mirrors are precisely positioned all along the operating since the cathode remains cold during said operating.

The commercial manufacture of said lasers can be carried out under good production conditions. It is merely necessary for example to bond the anodes 15 and 16 to the capillaries then to braze the capillaries 13 and 14 to the end plates 11 and 12 at the same time as the pip 19 (for these operations, it would be advantageous to utilise the brazing method described by the present Applicants in their U.S. patent application Ser. No. 302,416 filed on the Oct. 31, 1972.

Cathode 10 is then fixed to the two end plates 11 and 12 by a helium shielded arc welding process, for example, around the whole of its periphery in the manner indicated at F in FIG. 2. During this operation, a rod is introduced into the two capillaries so that they are located in precise alignment with one another. Once the operation is completed, the rod is removed, the mirrors 17 and 18 bonded to the anodes 15 and 16, the air is evacuated from the envelope and the envelope then filled with the gas mixture through the pip 19 which latter is then finally sealed.

The application of an appropriate excitation voltage between the two anodes 15 and 16, and the cathode 10 produces a discharge within the gas mixture, which, in fact, in the embodiment described here, consists of two parallel discharges between the cathode 10 and the two anodes 15 and 16.

The resonant cavity formed between the two mirrors 17 and 18 and constituted primarily by the spaces inside the capillaries 13 and 14, amplifies the laser wave in a conventional fashion. This wave leaves the cavity through one of the two mirrors which, to this end, is semi-transparent.

Trials carried out by the Applicants on lasers of this kind have shown that under certain operating conditions and at the end of a certain period of time, the power produced by the laser may be reduced. It would seem that this reduction in the quality of the resonant cavity is due to an accumulation of gas ions on the mirrors which are directly attached to the anodes.

FIG. 3 illustrates a variant embodiment of the mounting of these mirrors, by which it is possible to eliminate this drawback. The mirrors (here only the mirror 17 has been shown, it being self-evident that the mirror 18 is assembled in the same fashion), are bonded to one and the same intermediate insulator 20, of alumina for example, itself brazed to the anodes (at the same time as the components 13, 14).

The coaxial lasers in accordance with the present invention have substantial advantages in relation to prior art lasers.

As in the case of the lasers described in relation to FIG. 1, the conditions of cooling of their cathodes are extremely good and this makes it possible to improve their performance.

The laser constitutes a compact block the largest part of which, the cathode, is at earth potential. It is not fragile and can be inserted directly into systems, for example airborne equipment, with a minimum need for special precautions.

It is simple to manufacture and only requires machine operations (turning, brazing oven), without any manual work, such as glass-blowing.

Moreover, in the example described, the presence of two parallel discharges, thanks to the two anodes and two capillaries makes it possible, for the same output power, to utilise a lower supply voltage, and this is significant from the cost point of view and from the size and weight point of view in particular.

FIG. 4 schematically illustrates a variant embodiment of the coaxial laser which has been described hereinabove; it concerns a non symetrical laser having a single anode and then a single discharge.

The cathode 10 is constituted, as the cathode of the FIG. 2 laser, by a cylindrical aluminium tube to the ends of which there are soldered two end plates 11 and 12 likewise of aluminium. The end plate 11 is centrally traversed by a capillary tube 13 of a rigid insulating material, for example ceramic, said capillary tube extending outside the cathode and being tightly mounted outo said cathode, for example by means of the brazing method hereinabove referred to.

A cylindrical anode 15, made of covar for example is set on the extremity of said capillary tube 13 which extends outside the cathode through the plate 11. One of the two mirrors of the cavity, 17 for example, is bonded to the anode 15, for example by means of an intermediate insulator 20, of alumina for example, itself brazed to the anode.

The other extremity 14 of the capillary tube 13 centrally passes through the plate 12 but does not extend outside the cylinder constituted by the cathode 10 and said plate 12. Moreover, said extremity 14 of the capillary tube is not bonded to said plate 12 in such a way that the expansion of the capillary tube due to the heat produced by the discharge, does not produce mechanical distortions. The second mirror 18 of the resonant cavity is soldered at this extremity of the cylinder directly to the plate 12.

A cylindrical hole 21 is provided in the capillary tube 13, by which communication is established between the central passage 22 of the capillary tube and the gas-filled enclosure 23, in such a way that the discharge may occurs between the anode 15 and the cathode 10.

A pip 19, set on the plate 11 for example, makes it possible to evacuate the sealed enclosure 23, and then to fill it with a suitable gas mixture; it is then sealed using conventional methods.

The manufacturing of such lasers is realised in a way similar to that which has been described for two anodes coaxial lasers.

Of course, the invention is not limited to the embodiments described and shown, which were given solely by way of example.

What is claimed is:

1. A cold cathode gas laser of the coaxial type comprising: a cylindrical aluminium tube cathode; at least one insulating capillary tube coaxially disposed in said cathode; end plates coupled to said cathode, at least one of which for receiving said capillary tube for fixedly positioning said tube, one extremity of said capillary tube extending beyond the end of said tube cathode; said capillary tube having an opening to provide an open path between the interior of said capillary tube and the interior of said cylindrical aluminium tube forming said cathode; at least one cylindrical anode fixed at said one extremity of said capillary tube; two semi-reflective mirrors terminating a path which includes the interior of said at least one capillary tube for constituting an optical resonant cavity; means for sealing said cathode, said at least one capillary tube, said end plates, said at least one anode and said two semi-reflective mirrors and forming a gas-tight enclosure (i.e. the interior of said cathode and the interior of said optical resonant cavity); and said tight enclosure being filled with a laser gas mixture.

2. A gas laser as claimed in claim 1, comprising two insulating capillary tubes coaxially disposed in said cathode, but slightly separated one from the other (for providing said open path between said interior of said capillary tubes and said interior of said cathode), each of said capillary tubes having an extremity extending beyond the respective ends of said cylindrical tube cathode, a cylindrical anode being fixed at the extremity of each of said capillary tubes extending beyond said cathode, and said semi-reflective mirrors being fixed on both said anodes for constituting said optical resonant cavity.

3. A cold cathode gas laser of the coaxial type comprising:

at least one elongated insulating capillary tube having two extremities;

an elongated cylindrical aluminium tube cathode having a longitudinal axis and two extremities, said cathode being coaxially aligned with and surrounding a substantial length of said capillary tube, one of said extremities of said capillary tube extending beyond one extremity of said cathode;

first and second end-plates tightly connected respectively at each extremity of said cathode, said end-plates each having a central aperture aligned with said longitudinal axis of said cathode, said at least one capillary tube passing through and being connected to said central aperture of said first end plate;

at least one cylindrical anode fixed at said extremity of said capillary tube which passes through the first end plate (i.e. which extends beyond said one extremity of said cathode);

two semi-reflective mirrors terminating the path defined in part by the interior of said at least one capillary tube for constituting an optical resonant cavity, one of said semi-reflective mirrors being tightly fixed to said at least one anode;

means for providing communicaton between the interior of said at least one capillary tube and the interior of said cathode;

means for providing a tight enclosure of said optical resonant cavity including means for tightly sealing said central aperture of said second end plate; and a laser gas mixture filling said tight enclosure.

4. A gas laser as claimed in claim 3, wherein said at least one capillary tube comprises said one tube and:

a further capillary tube aligned with along said longitudinal axis of said cathode, said tubes being symetrically disposed related to said cathode and said end-plates, and being slightly separated one from the other for providing said means for communication between the interior of said capillary tube and said cathode, and wherein said enclosure means includes said further capillary tube being tightly connected to said second end-plate through which it passes; said laser further comprises a further cylindrical anode fixed at the extremity of said further capillary tube which extends beyond said other extremity of said cathode; and wherein the other of said two semi-reflective mirrors is tightly fixed to said further anode.

\* \* \* \* \*